US011981534B2

(12) United States Patent
Jariabka et al.

(10) Patent No.: US 11,981,534 B2
(45) Date of Patent: May 14, 2024

(54) SHARED MEDIA PATHS

(71) Applicant: Hewlett-Packard Development Company, L.P., Spring, TX (US)

(72) Inventors: Keith Jariabka, Vancouver, WA (US); John J. Cantrell, Vancouver, WA (US); Juan D. Ramos, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 180 days.

(21) Appl. No.: 17/588,906

(22) Filed: Jan. 31, 2022

(65) Prior Publication Data

US 2023/0242372 A1 Aug. 3, 2023

(51) Int. Cl.

| | |
|---|---|
| ***B65H 1/08*** | (2006.01) |
| ***B41J 11/00*** | (2006.01) |
| ***B65H 1/26*** | (2006.01) |
| ***B65H 7/06*** | (2006.01) |
| ***B65H 15/00*** | (2006.01) |
| ***B65H 83/02*** | (2006.01) |
| *B65H 3/00* | (2006.01) |
| *B65H 29/00* | (2006.01) |

(52) U.S. Cl.
CPC .......... *B65H 83/02* (2013.01); *B41J 11/0045* (2013.01); *B65H 1/08* (2013.01); *B65H 1/266* (2013.01); *B65H 7/06* (2013.01); *B65H 15/004* (2020.08); *B65H 3/00* (2013.01); *B65H 29/00* (2013.01)

(58) Field of Classification Search
CPC .......... B41J 11/0045; B65H 1/08; B65H 1/26; B65H 1/266; B65H 7/06; B65H 7/08; B65H 3/00; B65H 29/00
USPC .......................................... 271/126, 162, 164
See application file for complete search history.

(56) References Cited

U.S. PATENT DOCUMENTS 5,287,164 A * 2/1994 Watanabe .............. B65H 1/266 271/145
5,651,623 A * 7/1997 Stodder .............. H04N 1/00628 400/605
5,727,890 A * 3/1998 Stodder ................ B41J 11/0005 400/624
5,737,682 A * 4/1998 Yamagishi ............... B65H 3/44 271/3.03
6,776,405 B2 * 8/2004 Eskey ...................... B65H 3/44 271/9.03
7,077,517 B2 * 7/2006 Awai ........................ B41J 29/38 400/187
7,151,622 B2 * 12/2006 Suzuki ................. H04N 1/0461 358/496

(Continued)

*Primary Examiner* — Leslie A Nicholson, III
(74) *Attorney, Agent, or Firm* — Brooks, Cameron & Huebsch, PLLC

(57) ABSTRACT

In some examples, the disclosure describes a device that includes a first media tray positioned at a media input of a pick and separation mechanism, a second media tray positioned at the media input of the pick and separation mechanism, a media scan guide to position a sheet of print media at the media input of the pick and separation mechanism, a shared media path comprising a turn roller to receive the sheet of print media from the pick and separation mechanism from a first direction and provide the sheet of print media to a print zone in a second direction, and an output zone to receive the sheet of print media from the shared media path.

20 Claims, 8 Drawing Sheets

(56) References Cited

U.S. PATENT DOCUMENTS

| | | | | |
|---|---|---|---|---|
| 7,258,500 | B2 * | 8/2007 | Furihata | H04N 1/203 400/188 |
| 7,641,184 | B2 * | 1/2010 | Terashima | B65H 3/5261 271/10.13 |
| 7,887,038 | B2 * | 2/2011 | Shigeno | B65H 3/0684 271/9.08 |
| 7,899,342 | B2 * | 3/2011 | Kamei | G03G 15/6508 399/21 |
| 7,909,318 | B2 * | 3/2011 | Kim | B65H 3/5223 271/9.13 |
| 7,950,648 | B2 * | 5/2011 | Asakawa | B65H 3/0684 271/9.08 |
| 8,302,957 | B2 * | 11/2012 | Murray | B65H 3/0684 271/118 |
| 8,608,153 | B2 * | 12/2013 | Ro | B65H 1/266 271/9.13 |
| 8,695,973 | B2 * | 4/2014 | deJong | B65H 9/002 271/228 |
| 11,633,965 | B2 * | 4/2023 | Tsuji | B41J 11/70 400/621 |
| 2009/0003906 | A1 * | 1/2009 | Takeuchi | G03G 15/6511 399/357 |

* cited by examiner

SHARED MEDIA PATHS

BACKGROUND

Printing devices may be used for printing, for scanning, or for copying a sheet of print media. In some examples, the print device may be an All-In-One (AIO) print device capable of performing a print, a scan, and a copy process. In some examples, the print device may load the sheet of print media at the front of the printer for a print process and unload the sheet of print media at the front of the printer after the print process. This type of print device is called a front-in front-out or C-path print device.

DETAILED DESCRIPTION

Figure 1:
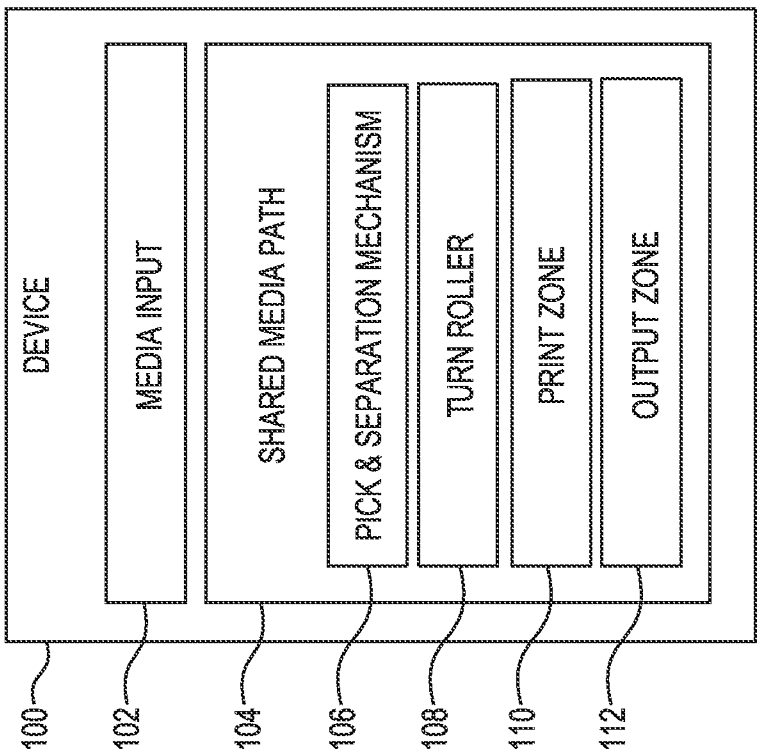
FIG. 1 illustrates an example of a device for printing processes utilizing a shared media path.

As noted above, printing devices may be used for various purposes, such as for printing, scanning, and/or copying a sheet of print media. These printing devices may be considered an All-In-One (AIO) printing device. At times, AIO printing devices may be large, bulky devices and/or devices with an office equipment aesthetic.

In some examples, the AIO printing device may be a front-in front-out (C-path) device. In this example, print media may be loaded into the front of the printing device with the paper path in a substantially horizontal orientation. As the print media is processed through the printing device, the print media is flipped over or inverted. At the completion of the printer process, the print media may exit the printing device at the front of the printing device in a substantially horizontal orientation (typically above the input tray). Some printing devices, including, without limitation, C-path AIO printing devices, may include a scan system with dedicated print media handling systems. Such systems may include a dedicated paper path for scanning functionality and may be referred to as an automatic document feed (ADF) system. The ADF system may be enabled using a scan bar, dedicated pick systems, trays, and/or various motors. The scanning system may also include a scan bed and the handling system may move paper in proximity to the scan bed. In addition to (or alternative to) an ADF scanning system, the printing device may have a door or lid installed over the scan bed for manual scanning. The door or lid may be manually lifted to place a sheet of print media on the scan bed. The sheet of print media may be scanned and the door or lid may be lifted again to retrieve the sheet of print media from the scan bed. The design attributes of the scan bed may increase manual interaction with the print device and limit the size of the sheet of print media scanned. Whether the scan system uses an ADF, a scan bed, or a combination thereof, the scan system may be located on top of the print system adding to the overall size of the printing device.

In some examples, the printing device may include a dedicated photo tray increasing the overall size of the printing device. In some examples, the document print media tray size may be reduced to minimize the printing device size increase caused by the addition of the dedicated photo tray system. In such an example, the media capacity of the document print media tray may be reduced resulting in an increase in manual interaction with the print device due to the increased frequency of document media restocking.

The present disclosure relates to a C-path AIO printing device capable of printing, scanning, copying, and duplexing (processing on both sides, front and back, of a sheet of print media) a sheet of print media utilizing a shared media path. A number of systems and devices for the shared media path are described herein. As used herein, a media path refers to the path of travel the sheet of print media takes through a printing device. As used herein, shared media path refers to the portion of the print process, the scan process, the copy process, and the duplexing process the AICA printing device utilizes for the same media path of travel. The shared media path may include, but is not limited to, a media input, a pick and separation mechanism, a turn roller, a scan zone, a print zone, and an output zone. (Examples of the present disclosure are not limited to a particular printing device hardware order.)

In some examples, the scan zone may include an in-line scan bar, integrated or imbedded into the shared media path. The in-line scan bar may be installed into the printing device as opposed to the dedicated print media handling system and scan bed and/or the ADF system with its dedicated pick systems, trays, and various motors. In these examples, the overall size of the C-path, AIO printing device may be reduced to a more compact and aesthetic design. Additionally, the in-line scan bar may reduce print media size limitations.

In some examples, a photo tray may be installed at the media input of the shared media path. The photo tray may engage with the media input of the shared media path during a photo print job and may disengage from the media input of the shared media path during a document print job. In these examples, the printing device may pick media from the photo tray or from the document tray without manual interaction to switch out media. The photo tray may be removed to accommodate additional document print media storage. In this example, the document media capacity of the printing device may be increased reducing printing device downtime due to media outage and reducing manual interaction with the printing device. Additionally, both the photo media tray and the document media tray may accommodate photo media increasing the photo print capability and capacity of the printing device.

In these examples, the more compact size of the C-path AIO printing device may reduce the overall weight of the printing device. Manufacturing and shipping costs of the printing device may be reduced as components that are utilized are reduced and/or eliminated, in turn reducing cost to the consumer. Additionally, environmental impact from a material usage and a scrap materials perspective may be reduced. Further, the shared media path of the print device may increase flexibility of the print device and reduce manual interaction minimizing down time.

FIG. 1 illustrates an example of a device 100 for C-path AIO printing processes utilizing a shared media path 104. In some examples, FIG. 1 can illustrate the device 100 that includes a media input 102 and the shared media path 104. In some examples, the shared media path 104 may include, but is not limited to, a pick and separation mechanism 106, a turn roller 108, a print zone 110, and an output zone 112.

As described herein, a sheet of print media may be printed, copied, scanned, and/or duplexed utilizing the media input 102 and the shared media path 104 of the C-path AIO printing device. The media input 102 and the shared media path 104 may be enclosed within the device 100 and not viewable during operations of the device 100.

Figure 2:
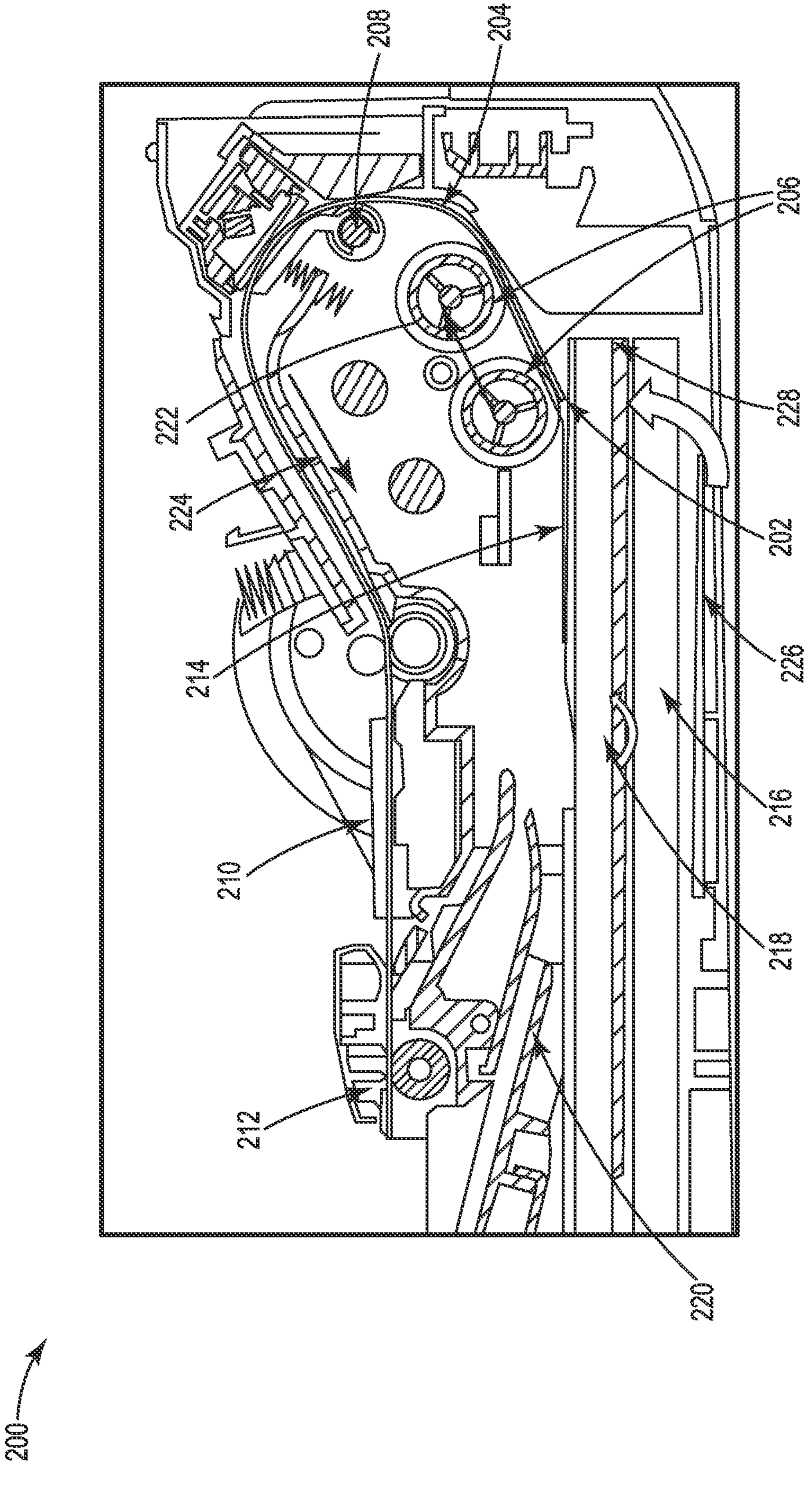
FIG. 2 illustrates an example of a device for printing processes utilizing a shared media path.

FIG. 2 illustrates an example of device 200 for printing processes utilizing a shared media path 204. In some examples, the device 200 includes the same or similar elements as device 100 as referenced in FIG. 1. For example, the device 200 can be a portion of a C-path AIO printing device.

In some examples, the device 200 may include a first media tray 216. The first media tray 216 may be positioned at a media input 202 of a pick and separation mechanism 206. In this example, the sheet of print media 214 may be picked from the first media tray 216 by the pick and separation mechanism 206 and fed into the shared media path 204.

In some examples, the device 200 may include a second media tray 218. The second media tray 218 may be positioned at the media input 202 of the pick and separation mechanism 206. In this example, the sheet of print media 214 may be picked from the second media tray 218 by the pick and separation mechanism 206 and fed into the shared media path 204.

In some examples, the device 200 may include a media scan guide 220. The media scan guide 220 may be used to guide a sheet of print media 214 into a side (e.g., the front) of the device 200 for a print, a scan, a copy, or a duplex process. In some examples, the media scan guide 220 may be utilized as a media scan path, an accessory path (e.g., special print jobs, etc.), and/or a photo media path. The media scan guide 220 may position the sheet of print media 214 at the media input 202 of the pick and separation mechanism 206. The sheet of print media 214 may be fed into the shared media path 204 at the print media input 202 of the shared media path 204.

The shared media path 204 may include a turn roller 208. As used herein, a turn roller 208 includes a print media roller (e.g., a single roper or a series of rollers located about an axis of a rotatable shaft, etc.) to invert the sheet of print media 214 within the shared media path 204. In some examples, the turn roller 208 may receive the sheet of print media 214 from the pick and separation mechanism 206 from a first direction 222. In some examples, the shared media path 204 may include a print zone 210. In some examples, the turn roller 208 may provide the sheet of print media 214 to the print zone 210 in a second direction 224. In these examples, the turn roller 208 may be positioned in the shared media path 204 between the pick and separation mechanism 206 and the print zone 210. In some examples, the shared media path 204 may include an output zone 212. The output zone 212 may receive the sheet of print media 214 from the print zone 210 of the shared media path 204. In this way, the sheet of print media 214 may enter the shared media path 204 at the side (e.g., the front) of the device 200 and exit the shared media path 204 at the side (e.g., the front) of the device 200 (C-path).

In some examples, the device 200 may include a media tray receiver 228. The media tray receiver 228 may receive the second media tray 218 (or removable media tray). The second media tray 218 may be positioned on or over the first media tray 216. In some examples, the device 200 may include a pressure plate 226. In some examples, the first media tray 216 may be positioned over the pressure plate 226. In some examples, the first media tray 216 and the second media tray 218 may be coupled to the pressure plate 226. The pressure plate 226 may raise from a default location (e.g., a position below the first media tray 216 and the second media tray 218) to raise the sheet of print media 214 of the second media tray 218. In such an example, the pressure plate 226 may thus engage the sheet of print media 214 of the second media tray 218 with the pick and separation mechanism 206 to allow the sheet of print media 214 to be picked from the second media tray 218. In this way, the pick and separation mechanism 206 may pick the sheet of print media 214 from the second media tray 218.

In some examples, the second media tray 218 of the device 200 may be a removable media tray. As used herein, a removable media tray includes a media tray that may be (completely or in-part) removed from, detached from, and/or not installed in the device 200. In some examples, the removable media tray may be a removable photo media tray. The removable photo media tray may be installed at the media input 202 of the shared media path 204. In some examples, the photo media tray may be engaged with the media input 202 of the shared media path 204 during a photo print job and may be disengaged from the media input 202 of the shared media path 204 during a document print job. In these examples, the pick and separation mechanism 206 may pick media from the photo media tray or from a document media tray without manual interaction to switch out media.

In some examples, the photo media tray may include a retractable gate (not shown in FIG. 2). The retractable gate may be in a retracted position while the photo media tray is in the engaged position. In such examples, while the photo media tray is in the engaged position the retractable gate may be moved out of the path of the photo media of the photo media tray. In such an example, the pressure plate 226 may raise to engage the photo media tray with the pick and separation mechanism 206 at the media input 202 of the shared media path 204 to allow photo media to be picked from the photo media tray.

In these examples, the sheet of print media 214 may be received at the media input 202 of the shared media path 204 via a first media tray 216, a second media tray 218, or a media scan guide 220 for a print, scan, copy, and/or duplexing process. The sheet of print media 214 may be positioned at the pick and separation mechanism 206 of the shared media path 204 by the pressure plate 226. The sheet of print media 214 may be picked by the pick and separation mechanism 206 and travel through the turn roller 208, the print zone 210, and the output zone 212 of the C-path print device shared media path 204.

Figure 3:
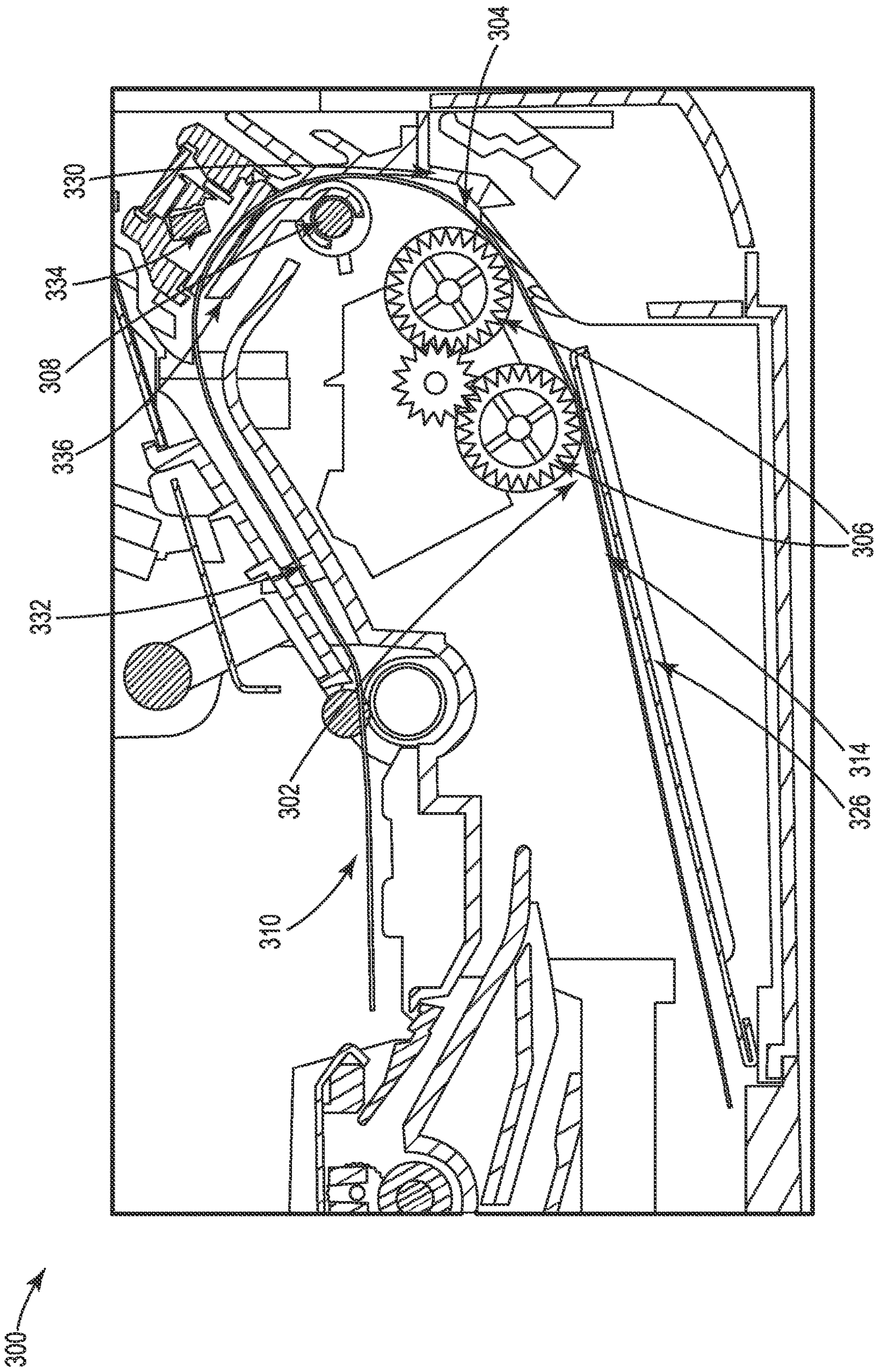
FIG. 3 illustrates an example of a device for printing processes utilizing a shared media path.

FIG. 3 illustrates an example of a device 300 for printing processes utilizing a shared media path 304. In some examples, the device 300 includes the same or similar elements as device 200 as referenced in FIG. 2 and/or device 100 as referenced in FIG. 1. For example, the device 300 can be a portion of a C-path AIO printing device. In some examples, the device 300 may include a first media tray (not shown in FIG. 3). In some examples, the first media tray may include a sheet of print media 314. In some examples, the first media tray may be coupled to a pressure plate 326. In such an example, the pressure plate 326 may raise to engage the sheet of print media 314 of the first media tray with the media input 302 of the pick and separation mechanism 306. In this way, the pressure plate 326 may bias the sheet of print media 314 of the first media tray against the pick and separation mechanism 306 at the media input 302 to allow the sheet of print media 314 to be picked from the first media tray 216. In this way, the pick and separation mechanism 306 may pick the sheet of print media 314 from the first media tray.

In some examples, the device 300 may include a first sensor 330. The first sensor 330 may monitor an alignment of the sheet of print media 314 for eliminating misregistration or misalignment (deskewing) of the sheet of print media 314 for proper processing (e.g., scanning, printing, etc.) of the sheet of print media 314. In some examples, the first sensor 330 may be positioned in the shared media path 304 after the pick and separation mechanism 306. In some examples, the leading edge of the sheet of print media 314 may be skewed (misregistered or misaligned) as the sheet of print media 314 enters the shared media path 304 from the pick and separation mechanism 306. In some examples, the sheet of print media 314 may be deskewed on a turn roller 308 located after the pick and separation mechanism 306 in the shared media path 304. The sheet of print media 314 may be deskewed in response to the first sensor 330 detecting the skew in the alignment of the sheet of print media 314. In this way, the sheet of print media 314 may exit the turn roller 308 with the leading edge aligned for proper processing of the sheet of print media 314.

In some examples, the device 300 may include a second sensor 332. The second sensor 332 may monitor the alignment of the sheet of print media 314 for eliminating misregistration or misalignment (deskewing) of the sheet of print media 314. In some examples, the second sensor 332 may be positioned in the shared media path 304 after the turn roller 308. The second sensor 332 may monitor the sheet of print media 314 alignment while the sheet of print media 314 enters a print zone 310. In some examples, the leading edge of the sheet of print media 314 may be skewed (misregistered or misaligned) prior to entering the print zone 310. In some examples, the skew in the leading edge of the sheet of print media 314 may have been created by a process of the shared media path 304 (e.g., scanning process, etc.) located prior to the print zone 310 of the shared media path 304. For proper print processing of the sheet of print media 314, the sheet of print media 314 may be deskewed in response to the second sensor 332 providing a position of the leading edge of the sheet of print media 314. In some examples, the device 300 may include a roller (not referenced in FIG. 3) prior to the print zone 310 to deskew the sheet of print media 314 in response to the second sensor 332 providing the position of the leading edge of the sheet of print media 314.

In some examples, the device 300 may include an in-line scan bar 334 integrated or imbedded in the shared media path 304. As used herein, an in-line scan bar 334 includes a static mechanism located within the shared media path 304 that may scan the sheet of print media 314 as the sheet of print media 314 travels past the in-line scan bar 334 of the shared media path 304. In some examples, the in-line scan bar 334 may be imbedded within a cleanout of the shared media path 304. The shared media path 304 may be enclosed within the device 300. The cleanout may include a mechanism to open the cleanout and provide access to the in-line scan bar 334. In such an example, the cleanout may be opened to remove the sheet of print media 314 in a media jam situation and/or to allow for cleaning of the in-line scan bar 334.

In some examples, the in-line scan bar 334 may be located in the shared media path 304 after the turn roller 308 and prior to the print zone 310. In some examples, the device 300 may include a biasing member 336. In these examples, the sheet of print media 314 may travel between the in-line scan bar 334 and the biasing member 336. The biasing member 336 may apply pressure to the sheet of print media 314 as the sheet of print media 314 travels past the in-line scan bar 334. In such an example, the sheet of print media 314 may be biased flat against the in-line scan bar 334 as the full length of the sheet of print media 314 travels past the in-line scan bar 334. In these examples, the length of the sheet of print media 314 may be up to and exceeding a legal media length.

In these examples, the sheet of print media 314 may travel through the in-line scan bar 334 and the print zone 310 of the shared media path 304. A biasing member 336 may press the sheet of print media 314 against the in-line scan bar 334 as the sheet of print media 314 travels past the in-line scan bar 334 to enable scanning of the sheet of print media 314. Sensors positioned prior to the in-line scan bar 334 (the first sensor 330) and the print zone 310 (the second sensor 332) may monitor for proper alignment of the leading edge of the sheet of print media 314. In these ways, any skew detected by the sensors in the alignment of the leading edge may be eliminated (deskewed) prior to the sheet of print media 314 entering the in-line scan bar 334 and/or the print zone 310 of the shared media path 304.

Figure 4A:
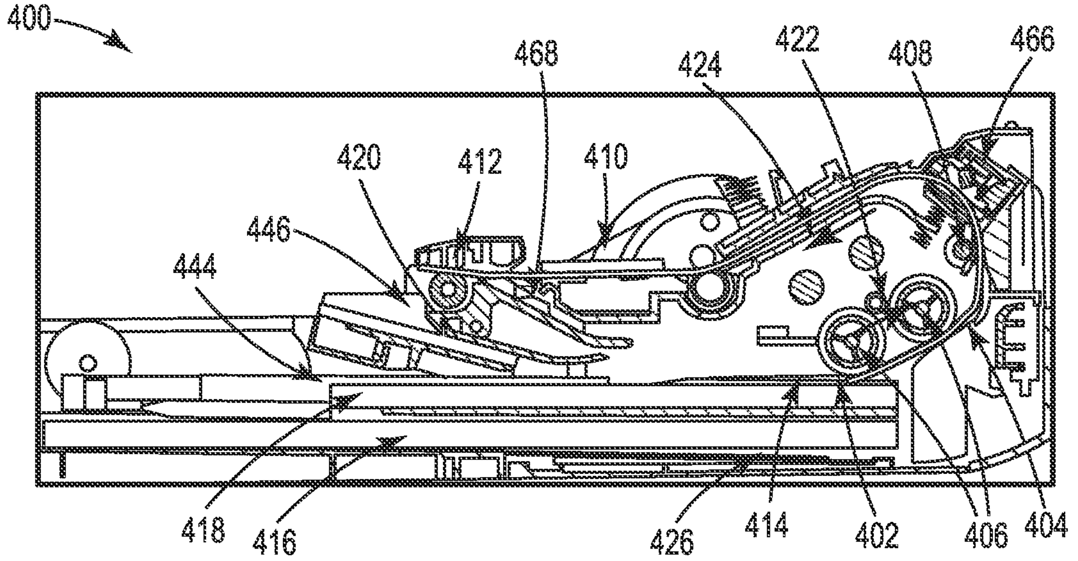
FIG. 4A illustrates an example of a device for printing processes utilizing a shared media path.

FIG. 4A illustrates an example of a device 400 for printing processes utilizing a shared media path 404. In some examples, the device 400 includes the same or similar elements as device 300 as referenced in FIG. 3, as device 200 as referenced in FIG. 2, and/or device 100 as referenced in FIG. 1. For example, the device 400 can illustrate a C-path AIO printing device. In some examples, the device 400 may include a first media tray 416 and a second media tray 418. The second media tray 418 may be a removable media tray. In some examples, the second media tray 418 may be in an engaged position 444. In some examples, while the second media tray 418 is in the engaged position 444 the second media tray 418 may be positioned between the first media tray 416 and a pick and separation mechanism 406. In such an example, a sheet of print media 414 from the second media tray 418 may be positioned at a media input 402 of the pick and separation mechanism 406.

In some examples, the device 400 may include an input media port 446. In some examples, while the second media tray 418 is in the disengaged position (not shown in FIG. 4A) the input media port 446 may be utilized as an accessory path (e.g., special print jobs, etc.) and/or a photo media path. In some examples, while the second media tray 418 is in the disengaged position the input media port 446, may be utilized as a media scan path. In some examples, the device 400 may include a media scan guide 420 coupled to the input media port 446. The media scan guide 420 may be used to guide the sheet of print media 414 into a side (e.g., the front) of the device 400 for a print, a scan, a copy, or a duplex process. The media scan guide 420 may position the sheet of print media 414 at the media input 402 of the pick and separation mechanism 406.

In some examples, the device 400 may include a media duplex guide 468. In some examples, while the second media tray 418 is in the disengaged position the media duplex guide 468 may be utilized for duplex printing, scanning, and/or copying the sheet of print media 414. In this way, a front side of the sheet of print media 414 and a back side of the sheet of print media 414 may be processed through the device 406. In some examples, the media duplex guide 468 may be positioned prior to an output zone 412 of the device 400. The media duplex guide 468 may be used to guide the sheet of print media 414 back into the shared media path 404 of the device 400. In this example, the media duplex guide 468 guides the sheet of print media 414 (processed on the first side of the sheet of print media 414), back into the shared media path 404 to process the second side of the sheet of print media 414. In some examples, the media duplex guide 468 may position the sheet of print media 414 at the media input 402 of the pick and separation mechanism 406. The sheet of print media 414 to be duplexed may utilize the shared media path 404. In this way, a front side of the sheet of print media 414 and a back side of the sheet of print media 414 may be processed through the device 400. In some examples, the duplex process may be an automatic process (e.g., not including manual interaction to process the second side of the sheet of print media 414).

In some examples, the device 400 may include a pressure plate 426. The pressure plate 426 may be an adjustable pressure plate (e.g., the pressure plate 426 may adjust in height and/or amount of pressure applied). In some examples, the pressure plate 426 may bias the sheet of print media 414 against the pick and separation mechanism 406. In some examples, while the second media tray 418 is in the engaged position 444 the sheet of print media 414 from the second media tray 418 may be positioned between the pressure plate 426 and the pick and separation mechanism 406. In this way, the sheet of print media 414 may be picked from the second media tray 418 by the pick and separation mechanism 406. In some examples, while the second media tray 418 is in the disengaged position (442 as referenced in FIG. 4B) the sheet of print media 414 from the first media tray 416 may be positioned between the pressure plate 426 and the pick and separation mechanism 406. In this way, the sheet of print media 414 may be picked from the first media tray 416 by the pick and separation mechanism 406. In some examples, while the second media tray 418 is in the disengaged position, the sheet of print media 414 may be guided into and picked by the pick and separation mechanism 406 by the media scan guide 420. In some examples, while the second media tray 418 is in the disengaged position the sheet of print media 414 may be guided into and picked by the pick and separation mechanism 406 by the media duplex guide 468.

In some examples, the device 400 may utilize the shared media path 404. In some examples, the shared media path 404 may include a turn roller 408 to receive the sheet of print media 414 from the pick and separation mechanism 406 from a first direction 422. The turn roller 408 may provide the sheet of print media 414 in a second direction 424. In some examples, the shared media path 404 may include a scan zone 466. The scan zone 466 may receive the sheet of print media 414 from the turn roller 408. In such an example, the scan zone 466 may scan a digital image of a print media substrate of the sheet of print media 414. In some examples, the shared media path 404 may include a print zone 410. The print zone 410 may receive the sheet of print media 414 from the scan zone 466. In some examples, the print zone 410 may print an image on the sheet of print media 414. In some examples, the shared media path 404 may include the output zone 412. The output zone 412 may receive the sheet of print media 414 from the print zone 410 of the shared media path 404. In this way, the sheet of print media 414 may enter the shared media path 404 at a side (e.g., the front) of the device 400 and exit the shared media path 404 at the side (e.g., the front) of the device 400.

Figure 4B:
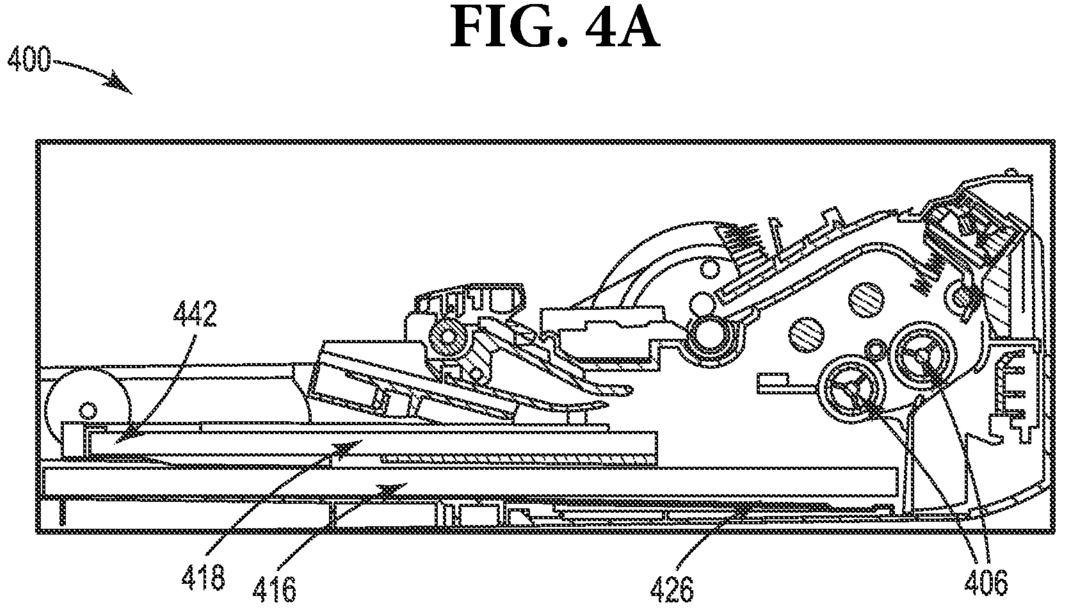
FIG. 4B illustrates an example of a device for printing processes utilizing a shared media path.

FIG. 4B illustrates an example of a device 400 for printing processes utilizing a shared media path. In some examples, the device 400 includes the same or similar elements as device 300 as referenced in FIG. 3, as device 200 as referenced in FIG. 2, and/or device 100 as referenced in FIG. 1. For example, the device 400 can illustrate a C-path, AIO printing device. In some examples, the device 400 may include a first media tray 416 and a second media tray 418. In some examples, the second media tray 418 may be a removable media tray. In some examples, the second media tray 418 may be in a disengaged position 442 (as compared to an engaged position 444 as referenced in FIG. 4A). In such an example, the disengaged position 442 of the second media tray 418 may position the second media tray 418 away from the operating area of the pressure plate 426. In such an example, while the second media tray 418 is in the disengaged position 442, the pressure plate 426 may not interact with the second media tray 418. In some examples, while the second media tray 418 is in the disengaged position 442 the pressure plate 426 may interact with the first media tray 416.

In some examples, the device 400 may be between printer jobs or may be in an idle status. In such an example, the pick and separation mechanism 406 may be clutched. In such an example, the second media tray 418 may be in the disengaged position 442. In some examples, while the device 400 is between printer jobs or idle the pressure plate 426 may be in a default location (e.g., a lowered position).

Figure 4C:
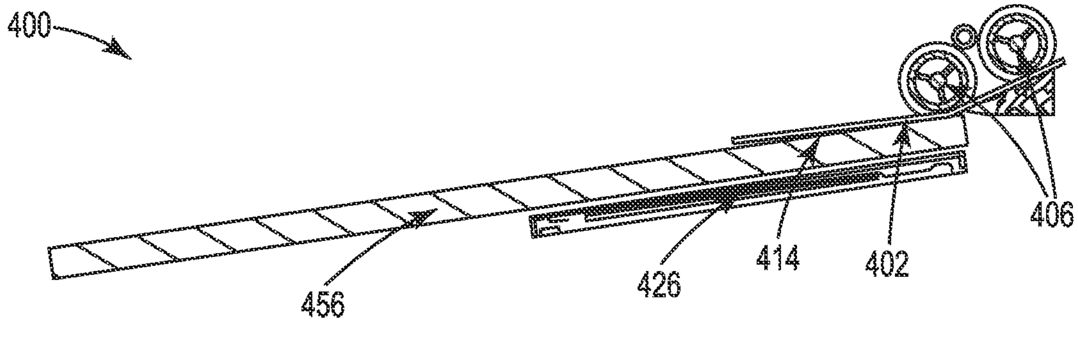
FIG. 4C illustrates an example of a device for engaging print media for printing processes utilizing a shared media path.

FIG. 4C illustrates an example of a device 400 for engaging print media for printing processes utilizing a shared media path. In some examples, the device 400 includes the same or similar elements as device 300 as referenced in FIG. 3, as device 200 as referenced in FIG. 2, and/or device 100 as referenced in FIG. 1. For example, the device 400 can be a portion of a C-path, AIO printing device. In some examples, the device 400 may include a first media tray (not shown in FIG. 4C) and a second media tray (not shown in FIG. 4C). In some examples, the second media tray may be a removable media tray. In some examples, the second media tray may be in a disengaged position (or not installed in the device 400). In some examples, while the second media tray is in the disengaged position (or not installed in the device) a sheet of print media 414 from the first media tray may be positioned at a media input 402 of a pick and separation mechanism 406.

In some examples, the device 400 may include a pressure plate 426 coupled to the first media tray. In some examples, the first media tray may include the sheet of print media 414. In some examples, the pressure plate 426 may raise from a default location to raise the sheet of print media 414 from the first media tray. The pressure plate 426 may thus engage the sheet of print media 414 with the media input 402 of the pick and separation mechanism 406. In some examples, the pressure plate 426 may bias the sheet of print media 414 of the first media tray against the pick and separation mechanism 406 at the media input 402. In this way, the pick and separation mechanism 406 may pick the sheet of print media 414 from the first media tray.

In some examples, the first media tray may include a stack of print media 456. The pressure plate 426 may raise from a default location to raise the stack of print media 456 and engage the top sheet of the stack of print media 456 with the media input 402 of the pick and separation mechanism 406. In this way, the pressure plate 426 may bias the top sheet of the stack of print media 456 against the pick and separation mechanism 406 at the media input 402 to allow the pick and separation mechanism 406 may pick the top sheet of the stack of print media 456 from the first media tray.

In these examples, the sheet of print media 414 may be printed, scanned, copied, and/or duplexed by entering at a side (e.g., the front) of the device 400 via the first media tray 416, the second media tray 418, the media scan guide 420, or the media duplex guide 468; traveling through the pick and separation mechanism 406, the turn roller 408, the scan zone 466, and the print zone 410 of the shared media path 404; and exiting through the output zone 412 of the shared media path 404 at the side (e.g., the front) of the device 400.

Figure 5:
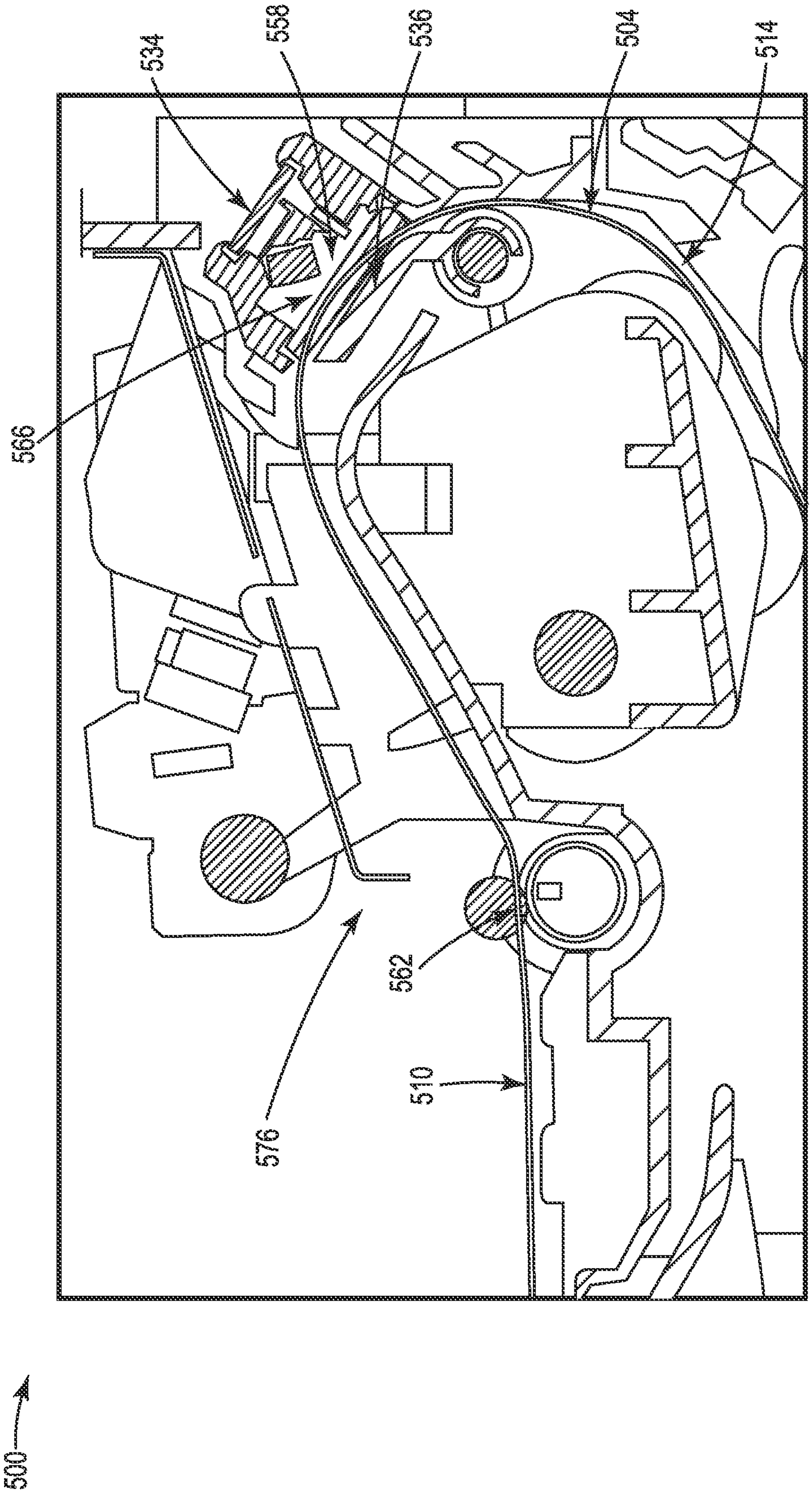
FIG. 5 illustrates an example of a device for printing processes utilizing a shared media path.

FIG. 5 illustrates an example of a device 500 for printing processes utilizing a shared media path 504. In some examples, the device 500 includes the same or similar elements as device 400 as referenced in FIGS. 4A, 4B, and 4C; as device 300 as referenced in FIG. 3; as device 200 as referenced in FIG. 2; and/or device 100 as referenced in FIG. 1. For example, the device 500 can be a portion of a C-path AIO printing device. In some examples, the shared media path 504 of the device 500 may include a scan zone 566. The scan zone 566 may include an in-line scan bar 534 integrated or imbedded in the shared media path 504. The in-line scan bar 534 may include a scan glass 558 coupled to the in-line scan bar 534. In some examples, the device 500 may include a biasing member 536. In these examples, a sheet of print media 514 may travel between the scan glass 558 of the in-line scan bar 534 and the biasing member 536. The biasing member 536 may apply pressure to the sheet of print media 514 as the sheet of print media 514 travels past the in-line scan bar 534. In such an example, the sheet of print media 514 may be biased or pressed flat against the scan glass 558 of the in-line scan bar 534. The sheet of print media 514 may be biased or pressed against the scan glass 558 as the full length of the sheet of print media 514 travels across the scan glass 558 and through the scan zone 566. In these examples, the in-line scan bar 534 may scan the entire length of the sheet of print media 514 as the sheet of print media 514 travels across the scan glass 558 (the length of the sheet of print media 514 may be up to and exceeding a legal media length).

In some examples, the scan zone 566 may be imbedded within a cleanout 576 of the shared media path 504. The cleanout 576 may include a mechanism to move (or open) a portion of an enclosure of the device 500 to provide access to the scan zone 566. In such examples, the cleanout 576 may be opened to remove the sheet of print media 514 from the scan zone 566 in a media jam situation and/or to allow for cleaning of the scan glass 558.

Device 500 may include a feed roller 562. In some examples, the feed roller 562 may receive the sheet of print media 514 from the in-line scan bar 534 of the scan zone 566. The feed roller 562 may provide the sheet of print media 514 to a print zone 510 to print an image on the sheet of print media 514.

Figure 6A:
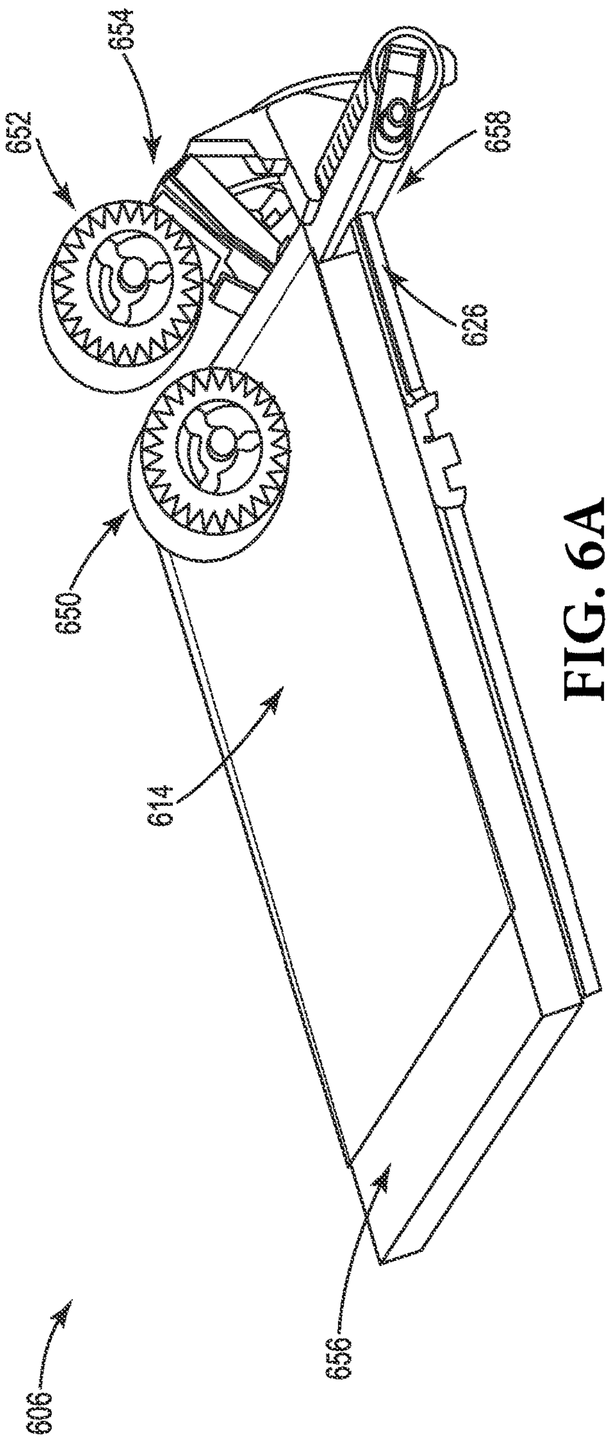
FIG. 6A illustrates an example of a system for a pick and separation mechanism for printing processes utilizing a shared media path.

FIG. 6A illustrates an example of a system for a pick and separation mechanism 606 for printing processes utilizing a shared media path. In some examples, the system for the pick and separation mechanism 606 includes the same or similar elements as pick and separation mechanism 406 as referenced in FIGS. 4A, 4B, and 4C; as pick and separation mechanism 306 as referenced in FIG. 3; as pick and separation mechanism 206 as referenced in FIG. 2; and/or as pick and separation mechanism 106 as referenced in FIG. 1. For example, the system for the pick and separation mechanism 606 can include a portion of a C-path, AIO printing system.

In some examples, a system for the pick and separation mechanism 606 may include a static pick and separation mechanism. In some examples, a system for the pick and separation mechanism 606 may include a pressure plate 626. The pressure plate 626 may be an adjustable pressure plate (e.g., the pressure plate 626 may adjust in height and/or amount of pressure applied). In some examples, the system for the pick and separation mechanism 606 may include a pick roller 650. In some examples, the pressure plate 626 may include a sheet of print media 614. The pressure plate 626 may raise the sheet of print media 614 up to the pick roller 650. The pick roller 650 may advance the sheet of print media 614 into the shared media path.

In some examples, the system of the pick and separation mechanism 606 may include a separation roller 652. In some examples, the system for the pick and separation mechanism 606 may include a separation pad 654. In some examples, the system for the pick and separation mechanism 606 may include a stack of print media 656. The separation roller 652 and the separation pad 654 may separate the sheet of print media 614 from the stack of print media 656.

In some examples, the system of the pick and separation mechanism 606 may include a print media registration loadstop 658. The print media registration loadstop 658 may register the leading edge of the sheet of print media 614 and/or the stack of print media 656 at the input of the shared media path. The pressure plate 626 may raise to engage the sheet of print media 614 with the pick roller 650 as the print media registration loadstop 658 retracts. In some examples, as the print media registration loadstop 658 retracts the pick roller 650 may advance the sheet of print media 614 forward to the separation roller 652 and the separation pad 654.

As described herein, the adjustable pressure plate may raise to engage the sheet of print media 614 with the pick roller 650 as the print media registration loadstop 658 retracts to enable the pick roller 650 to advance the sheet of print media 614 forward to the separation roller 652 and the separation pad 654. In this way, the sheet of print media 614 may be picked from the stack of print media 656. In some examples, after the sheet of print media 614 advances into the separation roller 652, the pressure plate 626 may lower to disengage from the pick roller 650 as the print media registration loadstop 658 gathers (or engages). In some examples, as the print media registration loadstop 658 gathers the pick roller 650 may be clutched.

Figure 6B:
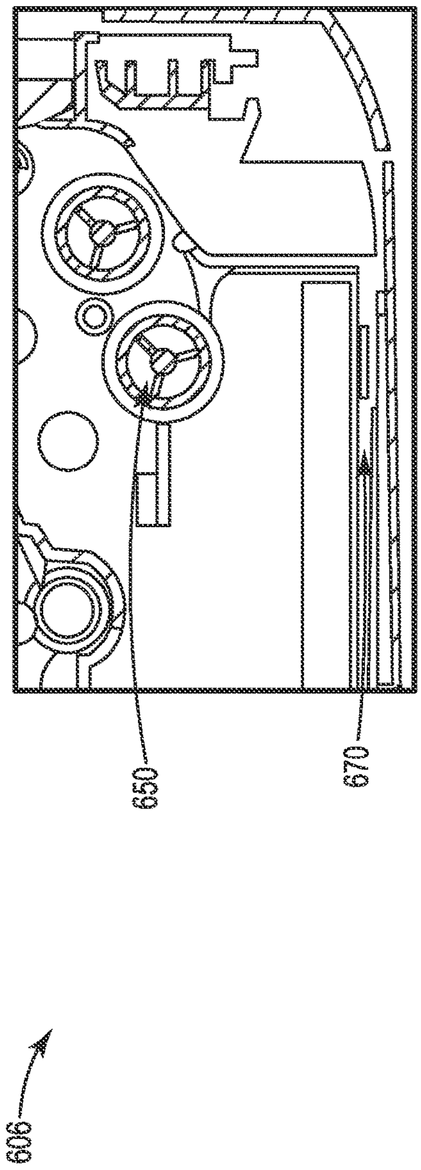
FIG. 6B illustrates an example of a system for a pick and separation mechanism for printing processes utilizing a shared media path.

FIG. 6B illustrates an example of a system for a pick and separation mechanism 606 for printing processes utilizing a shared media path. In some examples, the pick and separation mechanism 606 includes the same or similar elements as pick and separation mechanism 406 as referenced in FIGS. 4A, 4B, and 4C; as pick and separation mechanism 306 as referenced in FIG. 3; as pick and separation mechanism 206 as referenced in FIG. 2; and/or as pick and separation mechanism 106 as referenced in FIG. 1. For example, the system for the pick and separation mechanism 606 can be a portion of a C-path, AIO printing system.

In some examples, the system for the pick and separation mechanism 606 may be a static pick and separation mechanism. In some examples, while the system is in-between print jobs and/or idle the pressure plate may be in a lowered or default 670 location or position. In some examples, while the system is in-between print jobs and/or idle and the pressure plate is in the lowered or default position 670 (e.g., the lowered position may be the default location) the pick roller 650 may be clutched.

Figure 7:
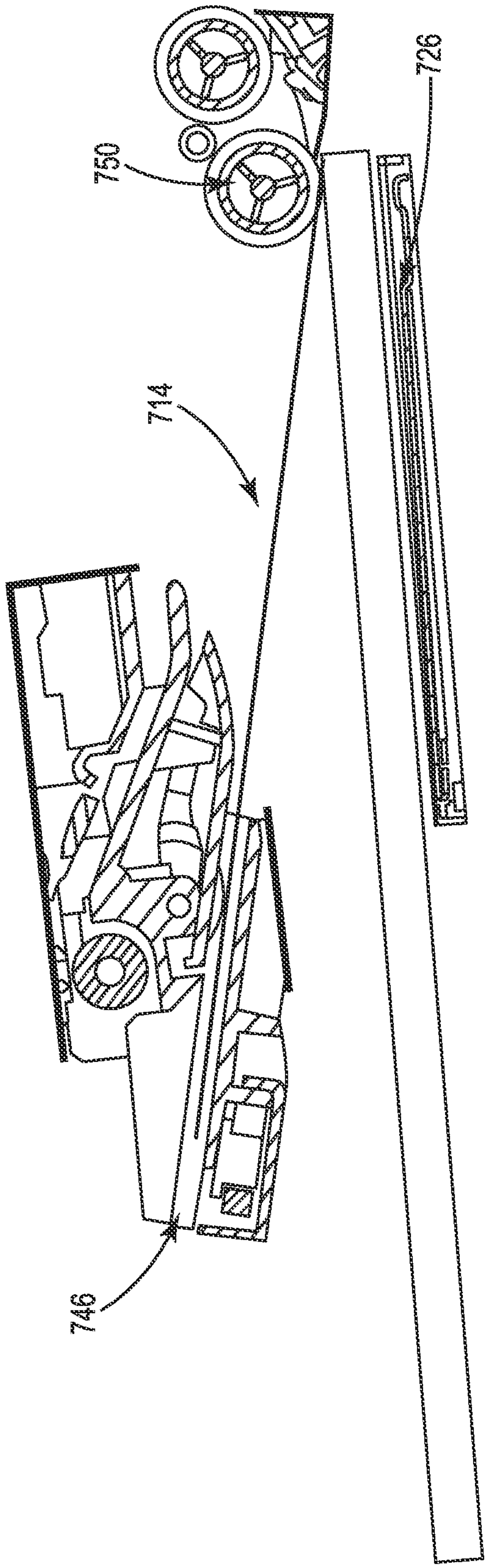
FIG. 7 illustrates an example of a system for a device for feeding a sheet of print media into a printing process utilizing a shared media path.

FIG. 7 illustrates an example of a system for a device for feeding a sheet of print media 714 into a printing process utilizing a shared media path. In some examples, the system includes the same or similar elements as pick and separation mechanism 606 as reference in FIGS. 6A and 6B; device 500 as reference in FIG. 5; as device 400 as referenced in FIGS. 4A, 4B, and 4C; as device 300 as referenced in FIG. 3; as device 200 as referenced in FIG. 2; and/or as device 100 as referenced in FIG. 1. For example, the system can be a portion of a C-path, AIO printing system.

In some examples, the system for the device for feeding the sheet of print media 714 into the printing process may include an input media port 746. The sheet of print media 714 may be received into the shared media path of the device from the input media port 746. In some examples, the system for the device for feeding the sheet of print media 714 into the printing process may include a first media tray (not shown in FIG. 7). The sheet of print media 714 may be received into the shared media path of the device from the first media tray. In some examples, the system for a device for feeding the sheet of print media 714 into the printing process may include a second media tray (not shown in FIG. 7). In some examples, the second media tray may be a removable media tray. In some examples, while the second media tray is installed and in an engaged position the sheet of print media 714 may be received into the shared media path of the device from the second media tray.

In some examples, the system for the device for feeding the sheet of print media 714 into the printing process may include a pressure plate 726. The pressure plate 726 may be an adjustable pressure plate. In some examples, the system for the device for feeding the sheet of print media 714 into the printing process may include a pick and separation mechanism. The pick and separation mechanism may include a pick roller 750. In some examples, the pressure plate 726 may adjust by raising to bias the sheet of print media 714 against the pick roller 750 of the pick and separation mechanism. In this way, the pressure plate 726 may bias the sheet of print media 714 received from the input media port 746 between the pressure plate 726 and the pick roller 750 of the pick and separation mechanism. In such an example, the second media tray is in the disengaged position (or not installed in the system).

In some examples, the second media tray may be in an engaged position. In some examples, the second media tray may be in the engaged position while the second media tray is positioned between the first media tray and the pick roller 750. In some examples, the second media tray may disengage from the pick roller 750 in response to the sheet of print media 714 being received from the input media port 746 or in response to the sheet of print media 714 being picked from the first media tray. Put another way, the sheet of print media 714 may be picked from the second media tray the while the second media tray is in the engaged position and the sheet of print media 714 may be fed or loaded into the input media port 746 or picked from the first media tray, while the second media tray is in the disengaged position (or is not installed in the system).

Figure 8:
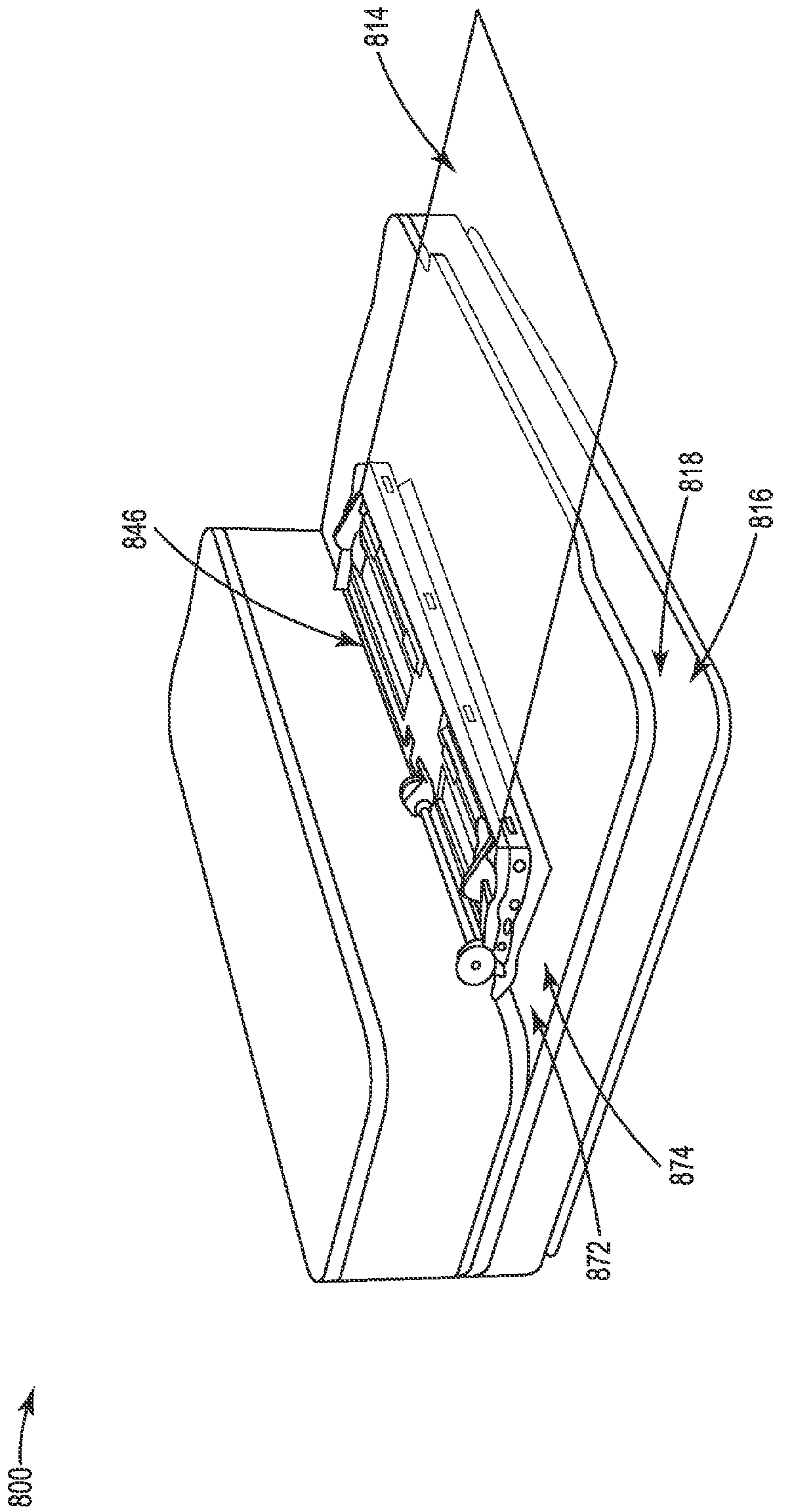
FIG. 8 illustrates an example of a system for a device for protecting scan sheets from a print process utilizing a shared media path.

FIG. 8 illustrates an example of a system 800 for a device for protecting scan sheets from a print process utilizing a shared media path. In some examples, the system 800 includes the same or similar elements as device 400 as referenced in FIGS. 4A and 4B and/or as device 200 as referenced in FIG. 2. For example, the system 800 can be a C-path AIO printing system. In some examples, the system 800 for the device for protecting scan sheets from a print process may include an input media port 846, a sensor 872 (or flag), and/or an encoder 874. In some examples, the sensor 872 and the encoder 874 may be coupled to the input media port 846. In some examples, a sheet of print media 814 may be fed or loaded into the input media port 846 of the system 800 (e.g., for a scan process, etc.). The sensor 872 and the encoder 874 may monitor the sheet of print media 814 fed or loaded into the input media port 846.

The sensor 872 may detect the leading edge of the sheet of print media 814 as the sheet of print media 814 is fed or loaded into the system 800. In some examples, the sensor 872 may detect the trailing edge of the sheet of print media 814 as the sheet of print media 814 is fed or loaded into the system 800. In these examples, the sensor 872 may monitor the advancement of the sheet of print media 814 into the system 800. In this way, the sensor 872 may monitor the full length of the sheet of print media 814 as the sheet of print media 814 travels through the input media port 846 and is fed or loaded into the system 800. In these examples, the length of the sheet of print media 814 may be up to and exceeding a legal media length. The sensor 872 may communicate the position of the sheet of print media 814 while the sheet of print media 814 is fed or loaded into the input media port 846 and may monitor to ensure the sheet of print media 814 is fully loaded into the system 800.

In some examples, the system 800 for the device for protecting scan sheets from a print process may include a first media tray 816. The first media tray 816 may be positioned at a media input of a pick and separation mechanism of the system 800 to pick a sheet of print media for a print process. In some examples, the system 800 for the device for protecting scan sheets from a print process may include a second media tray 818. The second media tray 818 may be positioned at the media input of the pick and separation mechanism of the system 800 to pick a sheet of print media for a print process. In some examples, the system 800 for the device for protecting scan sheets from a print process may include the input media port 846. The sheet of print media 814 may be fed or loaded into the media input of the pick and separation mechanism through the input media port 846 of the system 800. The sheet of print media 814 fed or loaded into the input media port 846 of the system 800 may be positioned at the media input of the pick and separation mechanism for a scan process of the sheet of print media 814.

As shown in FIG. 8, in some examples, the first media tray 816 and the second media tray 818 may be fully enclosed within the system 800. In this way, the first media tray 816 and the second media tray 818 may not be visible during operation of the printing system 800. In this way, the design may provide a compact, aesthetic, print-ready system 800.

In some examples, the sensor 872 and the encoder 874 may monitor the sheet of print media 814 fed or loaded into the input media port 846 for a scan process to prevent a sheet of print media from being picked by the pick and separation mechanism from the first media tray 816 and/or the second media tray 818 as the sheet of print media 814 is fed or loaded into the pick and separation mechanism through the input media port 846 of the system 800. In this way, as the sheet of print media 814 is fed or loaded into the pick and separation mechanism through the input media port 846 of the system 800 for a scan process of the sheet of print media 814 the print process of the system 800 may be disabled. In this way, the sheet of print media 814 may be protected from a print process.

In some examples, the sheet of print media 814 fed or loaded into the input media port 846 of the system 800 for a scan process may be copied to a sheet of print media of the first media tray 816 or the second media tray 818. As described herein, the sheet of print media 814 fed or loaded into the input media port 846 for a scan process may utilize a shared media path with a sheet of print media picked from the first media tray 816 and/or a sheet of print media picked from the second media tray 818. For example, the sheet of print media 814 may be fed or loaded into the media input of the pick and separation mechanism through the input media port 846, a sheet of print media may be fed or loaded into the media input of the pick and separation mechanism from the first media tray 816, or a sheet of print media may be fed or loaded into the media input of the pick and separation mechanism from the second media tray 818.

In some examples, the sensor 872 and the encoder 874 monitor the full length of the sheet of print media 814 as the sheet of print media 814 travels through the input media port 846 to the input media path of the pick and separation mechanism. In some examples, the sheet of print media 814 may be picked by the pick and separation mechanism and advanced into a shared media path. In some examples, the shared media path may include a scan zone (not shown in FIG. 8) to scan a digital image of a print media substrate of the sheet of print media 814. As described herein, the sensor 872 and the encoder 874 monitor the sheet of print media 814 during the scan process to protect the sheet of print media 814 from a print process. In these examples, the length of the sheet of print media 814 scanned may be up to and exceeding a legal media length. In these examples, a sheet of print media is picked at the media input of the pick and separation mechanism from the first media tray 816 or the second media tray 818 after the trailing edge of the sheet of print media 814 has traveled past the input media of the pick and separation mechanism and into the shared media path. In this way, the digital image of the print media substrate of the sheet of print media 814 may be scanned by the system 800 and printed on a sheet of print media picked from the first media tray 816 or the second media tray 818. As described herein, the sensor 872 and the encoder 874 of the system 800 may monitor the sheet of print media 814 to protect the original digital image of the print media substrate of the sheet of print media 814 from a print process during a copy process of the sheet of print media 814.

In some examples, a plurality of sheets of print media (e.g., 20 sheets of print media, etc.) may be fed or loaded into the input media port 846 of the system 800 for a scan process. In some examples, the plurality of sheets of print media may be fed or loaded into the media port 846 one at a time. The sensor 872 may indicate a presence of the sheets of print media remaining from the plurality of sheets of print media. In some examples, while the sensor 872 indicates the presence of sheets (or sheet) of print media the sheets (or sheet) of print media may be automatically fed or loaded into the media port 846 one at a time.

In some examples, both sides of the sheet of print media 814 may be printed, scanned, and/or copied utilizing a duplex process. In some examples, the system 800 may include a duplex media guide (not shown in FIG. 8). The system 800 may include a duplex media sensor (not shown in FIG. 8) to monitor a sheet of print media similar to the sensor 872 monitoring the scan/copy process, as described herein. In these examples, the digital image of the print media substrate of both sides of the sheet of print media 814 may be protected from the print process. In some examples, a plurality of sheets of print media (e.g., 20 sheets of print media, etc.) may be duplexed. The plurality of sheets of print media may be duplexed one at a time. For example, the sheet of print media 814 of the plurality of sheets of print media may be duplexed prior to the system 800 feeding or loading another sheet of print media from the plurality of sheets of print media into the media port 846. In this way, one sheet of print media may be processed through a duplex process at a time. In some examples, the system 800 may feed or load a duplexed sheet of print media back into the shared media path to invent (e.g., utilizing the turn roller not shown in FIG. 8) the duplexed sheet of print media. The duplexed sheet of print media may be fed or loaded back into the shared media path prior to outputting the duplexed sheet of print media from the system 800 and prior to feeding or loading the next sheet of print media into the media port 846. In this way, the duplexed sheet of print media may output from the system 800 in the same orientation as the sheet of print media 814 was received into the system 800. Additionally, in this way, a duplexed plurality of sheets of print media may output from the system 800 in the same order the plurality of sheets of print media were received into the system 800.

In some examples, the sheet of print media 814 may be fed or loaded into the system 800 at the input media port 846 and exited or output from the system 800 at the input media port 846. In this example, the input of the system 800, or the input media port 846 may also be the output of the system 800. The sensor 872 and the encoder 874 may monitor the sheet of print media 814 for printing, scanning, and/or coping process (e.g., to protect the original digital image of the print media substrate of the sheet of print media 814 from a print process during a copy process), as described herein. In such an example, the sheet of print media 814 may be fed or loaded into the system 800 at the same location as the sheet of print media 814 exits or outputs the system 800.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and methods of the disclosure. Since many examples can be made without departing from the spirit and scope of the system and method of the disclosure, this specification merely sets forth some of the many possible example configurations and implementations.

What is claimed is:

1. A device, comprising:
- a first media tray positioned at a media input of a pick and separation mechanism;
- a second media tray positioned at the media input of the pick and separation mechanism;
- a media scan guide to position a sheet of print media at the media input of the pick and separation mechanism;
- a shared media path comprising a turn roller to receive the sheet of print media from the pick and separation mechanism from a first direction and provide the sheet of print media, through a media scanning device, to a media printing device in a second direction, wherein the second direction is opposite of the first direction; and
- an output zone to receive the sheet of print media from the shared media path.

2. The device of claim 1, comprising a pressure plate to engage the sheet of print media of the first media tray with the media input of the pick and separation mechanism to allow the sheet of print media to be picked from the first media tray by the pick and separation mechanism.

3. The device of claim 1, wherein the second media tray is a removable media tray.

4. The device of claim 3, comprising a media tray receiver to receive the removable media tray, wherein a pressure plate raises up the sheet of print media of the removable media tray while positioned within the media tray receiver to the pick and separation mechanism to allow the pick and separation mechanism to pick the sheet of print media from the removable media tray.

5. The device of claim 1, wherein the second media tray is positioned on the first media tray and the first media tray is positioned on a pressure plate, the pressure plate to move the sheet of print media from the second media tray to the pick and separation mechanism to pick the sheet of print media from the second media tray.

6. The device of claim 1, further comprising:
- a first sensor to monitor an alignment of the sheet of print media for deskewing the sheet of print media on the turn roller; and
- a second sensor to monitor the alignment of the sheet of print media for deskewing the sheet of print media while the sheet of print media travels into the media printing device.

7. The device of claim 1, the device further comprising:
- an in-line scan bar of the media scanning device, the in-line scan bar to scan the sheet of print media as the sheet of print media travels past the in-line scan bar; and
- a biasing member, of the media scanning device, to apply pressure to the sheet of print media as the sheet of print media travels past the in-line scan bar.

8. A print device, comprising:
- a first media tray and a second media tray, wherein a sheet of print media is positioned at a media input of a pick and separation mechanism from the first media tray while the second media tray is in a disengaged position and the sheet of print media is positioned at the media input of the pick and separation mechanism from the second media tray while the second media tray is in an engaged position;
- an input media port coupled to a media scan guide, the media scan guide to position the sheet of print media at the media input of the pick and separation mechanism;
- a pressure plate to bias the sheet of print media against the pick and separation mechanism;
- a shared media path comprising a turn roller to receive the sheet of print media from the pick and separation mechanism from a first direction and provide the sheet of print media, through a media scanning device, to a media printing device in a second direction, wherein the second direction is opposite of the first direction; and
- an output zone to receive the sheet of print media from the shared media path.

9. The print device of claim 8, wherein the input media port is utilized as a media scan path, an accessory path, and a photo media path.

10. The print device of claim 8, wherein the pick and separation mechanism comprises:
- a pick roller to advance the sheet of print media into the shared media path; and
- a separation roller and a separation pad to separate the sheet of print media from a stack of print media.

11. The print device of claim 8, further comprising:
- an in-line scan bar of the media scanning device, the in-line scan bar comprising a scan glass;
- a biasing member, of the media scanning device, to press the sheet of print media against the scan glass as the sheet of print media travels across the scan glass, wherein the in-line scan bar scans the sheet of print media as the sheet of print media travels across the scan glass; and
- a cleanout mechanism to move a portion of an enclosure to provide access to the in-line scan bar.

12. The print device of claim 11, further comprising a feed roller to receive the sheet of print media from the in-line scan bar and provide the sheet of print media to the media printing device.

13. A system comprising:
- a first media tray and a second media tray, wherein a sheet of print media is positioned at a media input of a pick and separation mechanism from the first media tray while the second media tray is in a disengaged position and the sheet of print media is positioned at the media input of the pick and separation mechanism from the second media tray while the second media tray is in an engaged position;
- an input media port coupled to a media scan guide, the media scan guide to position the sheet of print media at the media input of the pick and separation mechanism;
- an adjustable pressure plate to bias the sheet of print media against the pick and separation mechanism; and
- a shared media path comprising:
  - a turn roller to receive the sheet of print media from the pick and separation mechanism from a first direction and provide the sheet of print media in a second direction;
  - a media scanning device to receive the sheet of print media from the turn roller to scan a digital image of a print media substrate of the sheet of print media;
  - a media printing device to receive the sheet of print media from the media scanning zone to print an image on the sheet of print media; and an output zone to receive the sheet of print media from the shared media path.

14. The system of claim 13, wherein the pick and separation mechanism is static and comprises:

a pick roller to advance the sheet of print media into the shared media path; and a separation roller and a separation pad to separate the sheet of print media from a stack of print media.

15. The system of claim 14, wherein:

the adjustable pressure plate raises to engage the sheet of print media with the pick roller as a print media registration loadstop retracts to enable the pick roller to advance the sheet of print media forward to the separation roller and the separation pad; and the pick roller is clutched when the adjustable pressure plate is lowered into a default location.

16. The system of claim 14, wherein the second media tray is a removable media tray and the adjustable pressure plate biases the sheet of print media received from the input media port between the adjustable pressure plate and the pick roller while the removable media tray is in the disengaged position.

17. The system of claim 14, wherein the second media tray is in the engaged position while the second media tray is positioned between the first media tray and the pick roller.

18. The system of claim 13, wherein the media scanning device comprises:

an in-line scan bar comprising a scan glass; and a biasing member to press the sheet of print media against the scan glass as the sheet of print media travels across the scan glass, wherein the in-line scan bar scans the sheet of print media as the sheet of print media travels across the scan glass.

19. The system of claim 13, further comprising a sensor and an encoder to monitor the sheet of print media during a scan process to protect the sheet of print media from a print process.

20. The system of claim 13, further comprising a media duplex guide to position the sheet of print media at the media input of the pick and separation mechanism for duplex printing, scanning, and copying.

* * * * *